US007899086B2

(12) United States Patent
Belling (10) Patent No.: US 7,899,086 B2
(45) Date of Patent: Mar. 1, 2011

(54) METHOD FOR SIGNALING OF A CHANGE FROM A FIRST SERVICE TO A SECOND SERVICE DURING A CALL BY MODIFYING THE UTILIZED CODEC (75) Inventor: Thomas Belling, Erding (DE)

(73) Assignee: Siemens Aktiengesellschaft, Munich (DE)

( * ) Notice: Subject to any disclaimer, the term of this patent is extended or adjusted under 35 U.S.C. 154(b) by 763 days.

(21) Appl. No.: 11/883,777

(22) PCT Filed: Jan. 24, 2006

(86) PCT No.: PCT/EP2006/050402

§ 371 (c)(1),
(2), (4) Date: Aug. 6, 2007

(87) PCT Pub. No.: WO2006/084791

PCT Pub. Date: Aug. 17, 2006

(65) Prior Publication Data

US 2008/0152115 A1    Jun. 26, 2008

(30) Foreign Application Priority Data

Feb. 10, 2005   (DE)   ................. 10 2005 006 174

(51) Int. Cl.
    H04M 3/00   (2006.01)
(52) U.S. Cl. .................... 370/524; 455/414.1; 455/418; 455/412.1; 455/567; 700/94; 700/18; 700/109
(58) Field of Classification Search ......... 455/418–419, 455/414.1, 567, 412.1, 412.2; 700/94, 18, 700/109; 370/329, 522
See application file for complete search history.

(56) References Cited

U.S. PATENT DOCUMENTS

| 6,134,434 | A | 10/2000 | Krishnamurthi et al. | |
|---|---|---|---|---|
| 2001/0038615 | A1* | 11/2001 | Chang | 370/329 |
| 2005/0180338 | A1* | 8/2005 | Pirila et al. | 370/252 |
| 2006/0135257 | A1* | 6/2006 | Nourry et al. | 463/38 |

OTHER PUBLICATIONS

"Universal Mobile Telecommunications System (UMTS); Technical realization of Circuit Switched (CS) multimedia service; UDI/RDI fallback and service modification; Stage 2 (3GPP TS 23.172 version 6.1.0 Release 6); ETSI TS 123 172"; ETSI Standards, European Telecommunications Standards Institute, Sophia, Antipo, FR vol. 3-CN3, No. V610; Sep. 2004; XP014027515; ISSN: 0000-0001.

* cited by examiner

Primary Examiner—Nick Corsaro
Assistant Examiner—Quan M Hua
(74) Attorney, Agent, or Firm—Laurence A. Greenberg; Werner H. Stemer; Ralph E. Locher (57) ABSTRACT A method is provided for signaling a change from a first service to a second service during a call between a terminal device and a further terminal device over at least one communication network. When a change from the first service to the second service takes place during a call between the terminal device and the further terminal device, a network unit of the communication network, via which the terminal device is currently communicating to at least one further network unit, signals whether the change was initiated by the terminal device or by a network unit of the communication network.

24 Claims, 4 Drawing Sheets

FIG 1

Prior Art

METHOD FOR SIGNALING OF A CHANGE FROM A FIRST SERVICE TO A SECOND SERVICE DURING A CALL BY MODIFYING THE UTILIZED CODEC

BACKGROUND OF THE INVENTION

The invention relates to a method and a network unit for signaling a change from a first service to a second service during a call between a terminal device and a further terminal device over at least one communication network.

FIELD OF THE INVENTION

The feature referred to as the "Service Change and UDI Fallback Service" (SCUDIF) for 3GPP mobile radio networks has been standardized by the 3GPP in the specification TS 23.172. During the setting up of calls SCUDIF enables a negotiation to take place concerning whether a video telephony or a voice telephony connection will be established. If, for example, the caller does not support video telephony with his terminal device, a voice connection will be set up. In addition, SCUDIF allows the users of a terminal device to switch between voice telephony and video telephony during an existing user traffic connection. Furthermore, a network unit of a communication network on the side of any user with his terminal device can initiate the change from video telephony to voice telephony if that is advantageous for example because of deteriorating transmission conditions or shortage of resources at the air (radio) interface. When improved transmission conditions or sufficient resources are available again subsequently, the network unit of the communication network on the side of said user with his terminal device can then once again initiate a change from voice telephony back to video telephony.

If initially a voice telephony connection was set up, a user can initiate a change to video telephony with his terminal device during the call. Said user can also be the originally called user. It is necessary that as of this moment in time the user who initiated the change to video telephony with his terminal device is billed for the call or else at least for the additional costs arising due to video telephony compared to voice telephony, and also that the network operators are able to allocate the costs accordingly among themselves.

If, however, the network on the side of a subscriber initiated a change from video telephony to voice telephony and a subsequent change back to video telephony, it is necessary that as of the moment in time of the change to video telephony, not this user, but the user who originally initiated video telephony is billed for the call or else at least for the additional costs arising due to video telephony compared to voice telephony, and also that the network operators are able to allocate the costs accordingly among themselves.

In what is termed the "core network" of the 3GPP mobile radio network, units referred to as "Mobile Services Switching Centers" (MSCs) are used as switching units. A distinction is made between what is termed the "serving MSC" (S-MSC) and what is termed the "gateway MSC" (G-MSC). The S-MSC of a user with his terminal device is located in the mobile radio network in which the user with his terminal device currently resides and connects the core network to what is referred to as the "radio access network". The G-MSC of a user with his terminal device is located in what is termed the home mobile radio network, in which the user with his terminal device is registered with a network operator and connects said mobile radio network to networks on the side of the other user with his further terminal device.

In the core network, that is to say between the switching units MSCS, SCUDIF uses BICC codec negotiation (see 3GPP TS 23.153 and ITU-T Q.1902.5), with what is termed the "MuMe dummy codec" standardized in TS 26.103 being used for signaling video telephony.

BRIEF SUMMARY OF THE INVENTION

The object of the invention is to be seen in proposing an efficient and cost-effective means for signaling a change from a first service to a second service during a call.

The object is achieved according to the invention in each case by the subject matter of the independent claims. Developments of the invention are set forth in the dependent claims.

A core of the invention is to be seen in that when a change from a first service to a second service takes place during a call between a terminal device and a further terminal device over at least one communication network, a network unit of the communication network via which the terminal device is currently communicating signals to at least one further network unit whether the change was initiated by the terminal device or by a network unit of the communication network.

The network unit on the side of a user with his terminal device, in other words the network unit of the communication network via which the terminal device is currently communicating, for example the serving switching unit S-MSC, the serving GPRS support node SGSN etc., signals to at least one further network unit, for example the serving switching unit S-MSC, the serving GPRS support node SGSN, a gateway switching unit, a gateway GPRS support node GGSN etc., during the change from services in a call, for example between voice telephony, text telephony service, image telephony service or video telephony, whether the change was initiated by the terminal device or by the communication network. A communication network, in this scenario, may be a packet-switching communication network, a cellular mobile radio network, an IP network etc., and a mobile radio terminal device, a mobile computer, a mobile organizer, a computer etc. may be used inter alia as the terminal device.

In an advantageous embodiment said signaling is used when a change takes place from a voice telephony service to a video telephony service.

Since the change from voice telephony to video telephony initiated by the communication network was not introduced until a later edition of the TS 23.172 standard (in 3GPP Rel-6) than the change initiated by the user (in 3GPP Rel-5), it is advantageous if, by means of an extension to the existing signaling, it is only indicated when the change was initiated by a network unit of the communication network. In this way a network unit, for example a serving switching unit S-MSC which does not support signaling initiated by the communication network, does not need to send the signaling extension.

In a particularly advantageous embodiment, at least one new parameter is introduced for this purpose within the MuMe dummy codec, said parameter indicating whether the change was initiated by the user with his terminal device or by a network unit of the communication network. Preferably what is termed the "most significant" bit (highest-value bit) of what is termed the "Bandwidth Multiplier" parameter of the MuMe dummy codec can then be set or, as the case may be, changed for this purpose if, for example, the service change was initiated by a network unit of the communication network. Said bit will not be needed for other purposes within a foreseeable period since it would require a connection with a bandwidth greater than 128*64 kbit/s. In this way the requisite modification of the encoding is kept to a minimum.

In an alternative advantageous embodiment the MuMe dummy codec is replaced in the BICC codec negotiation by a new dummy codec that includes a new parameter which indicates, for example, whether the change to video telephony was initiated by a network unit of the communication network. This embodiment has the advantage that a switching unit conforming to release Rel-5 which does not yet support the new dummy codec will itself not offer this codec in the BICC codec negotiation and will reject the new dummy codec if said codec is offered to it. A switching unit MSC which does support the new dummy codec should additionally offer the previous MuMe dummy codec in order to enable a connection setup using switching units MSCs which do not yet support the new dummy codec. In this way a situation can be avoided whereby a change initiated by the communication network is activated but is not recognized by the Rel-5 switching unit MSC and consequently is possibly not correctly billed.

In an alternative particularly advantageous embodiment the already standardized MuMe dummy codec is only used in the signaling for the service change if the terminal device initiated the change to a video transmission (video telephony service). A further additional MuMe dummy codec is newly introduced which will be used only if a network unit of the communication network initiated the service change to a video telephony service. The new further MuMe dummy codec corresponds in this case to the MuME dummy codec according to TS 26.103, although in order to differentiate it a different value is used in what is referred to as the Codec Identifier parameter. This embodiment has the same advantages as the last embodiment described. In addition, there are even fewer changes in the encoding, with the result that the overhead for adapting the participating network nodes is also less.

It is advantageous that network units which send or receive signaling indicating that a terminal device has initiated a service store information concerning which terminal device initiated the service. From the stored information, which may include information identifying the terminal device, it is possible, in the case of a change to said service initiated by a network unit of the communication network, to conclude which terminal device is to be billed for the service.

The further network units which receive the signaling that initiates the change of services during a call, for example between voice telephony and video telephony, derive from the signaling according to the invention whether the change was initiated by the terminal device or by a network unit of the communication network. Network nodes of this type can be for example a serving switching unit S-MSC or a gateway switching unit G-MSC. The network units can use this information to distinguish in data that they have recorded or forwarded, for example, for call charging purposes whether the change was initiated by a network unit of the communication network or by the terminal device. In this case the charging is performed by a billing unit. If, for example, the change from a voice telephony service to a video telephony service was initiated by a user (or, as the case may be, his terminal device), as of this instant the user with his terminal device who initiated the change is billed for the call or else at least for the additional costs arising due to the video telephony service compared to the voice telephony service, and the network operators likewise allocate the costs among themselves accordingly.

If, for example, the change from the voice telephony service (without video transmission) to the video telephony service was initiated by a network unit of the communication network, from the instant of the change to the video telephony service the call or else at least the additional costs arising due to the video telephony service compared to the voice telephony service are billed to the subscriber who, for example, originally initiated the video telephony service, and the network operators likewise allocate the costs among themselves accordingly.

An advantage of the invention is that all network units in the core network are able to distinguish in a particularly simple manner whether a change of services was initiated by a network unit of the communication network or by a terminal device. In this way it is made possible for correct billing for a video telephony service within the scope of SCUDIF to be performed in respect of the users with their terminal devices and between the network operators.

BRIEF DESCRIPTION OF THE SEVERAL VIEWS OF THE DRAWINGS

The invention is explained in more detail below with reference to an exemplary embodiment depicted in a figure, in which.

DETAILED DESCRIPTION OF THE INVENTION

Figure 1:
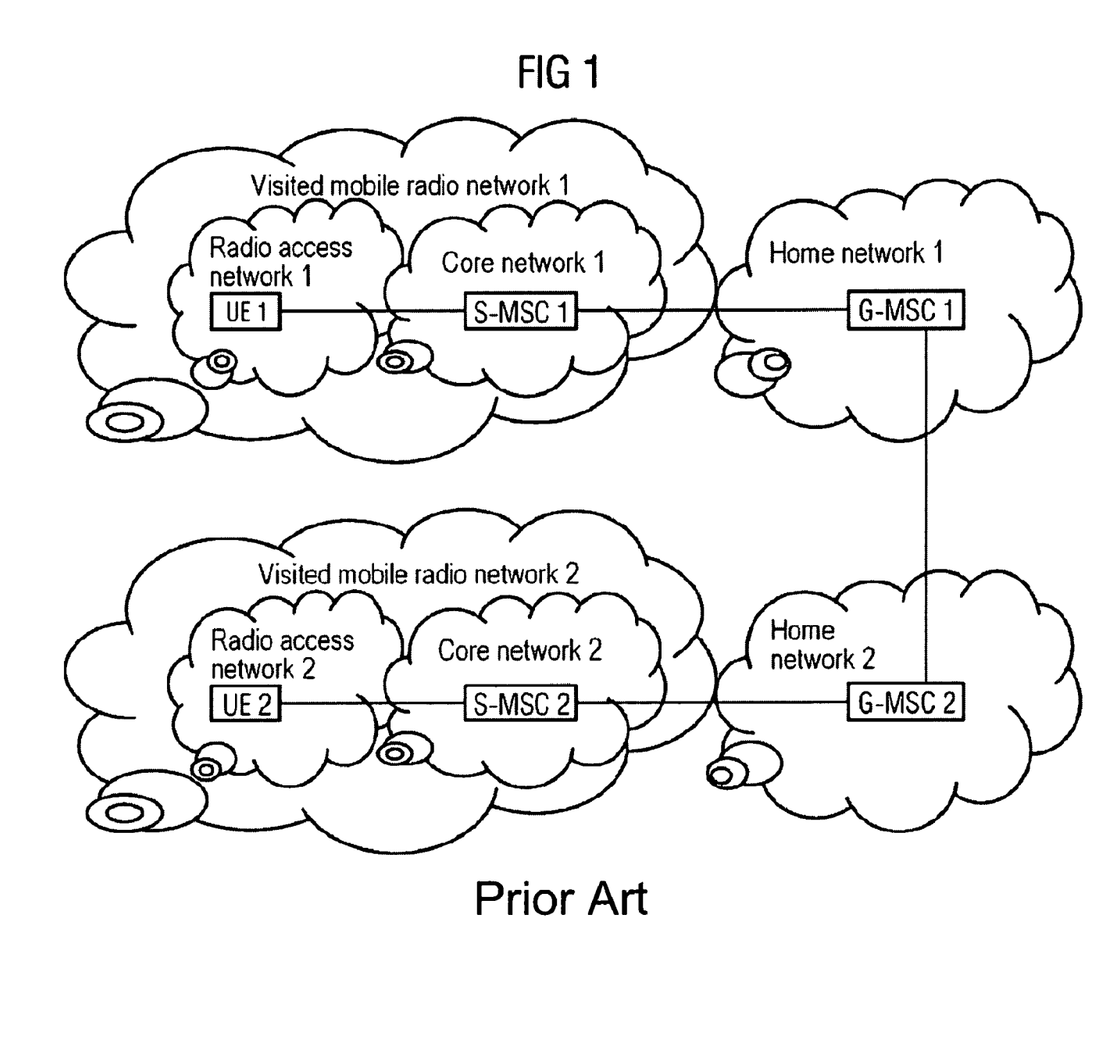
FIG. 1 shows a typical communication network configuration.

FIG. 1 shows a typical network configuration. The figure depicts two terminal devices UE 1 and UE 2 which are located in what are referred to as the "visited" mobile radio networks 1 and 2, respectively, and are registered in what are referred to as the "home networks" 1 and 2, respectively. The visited mobile radio networks consist in each case of a radio access network and a core network and include what is referred to as a serving switching unit "serving" MSC, S-MSC 1 and S-MSC 2, respectively. Each of the home networks includes what is referred to as a gateway switching unit "gateway MSC", G-MSC 1 and G-MSC 2, respectively. The terminal device UE 1 is connected to the further terminal device UE 2 via the serving switching unit S-MSC 1, the gateway switching unit G-MSC 1, the gateway switching unit G-MSC 2 and the serving switching unit S-MSC 2.

Figure 2:
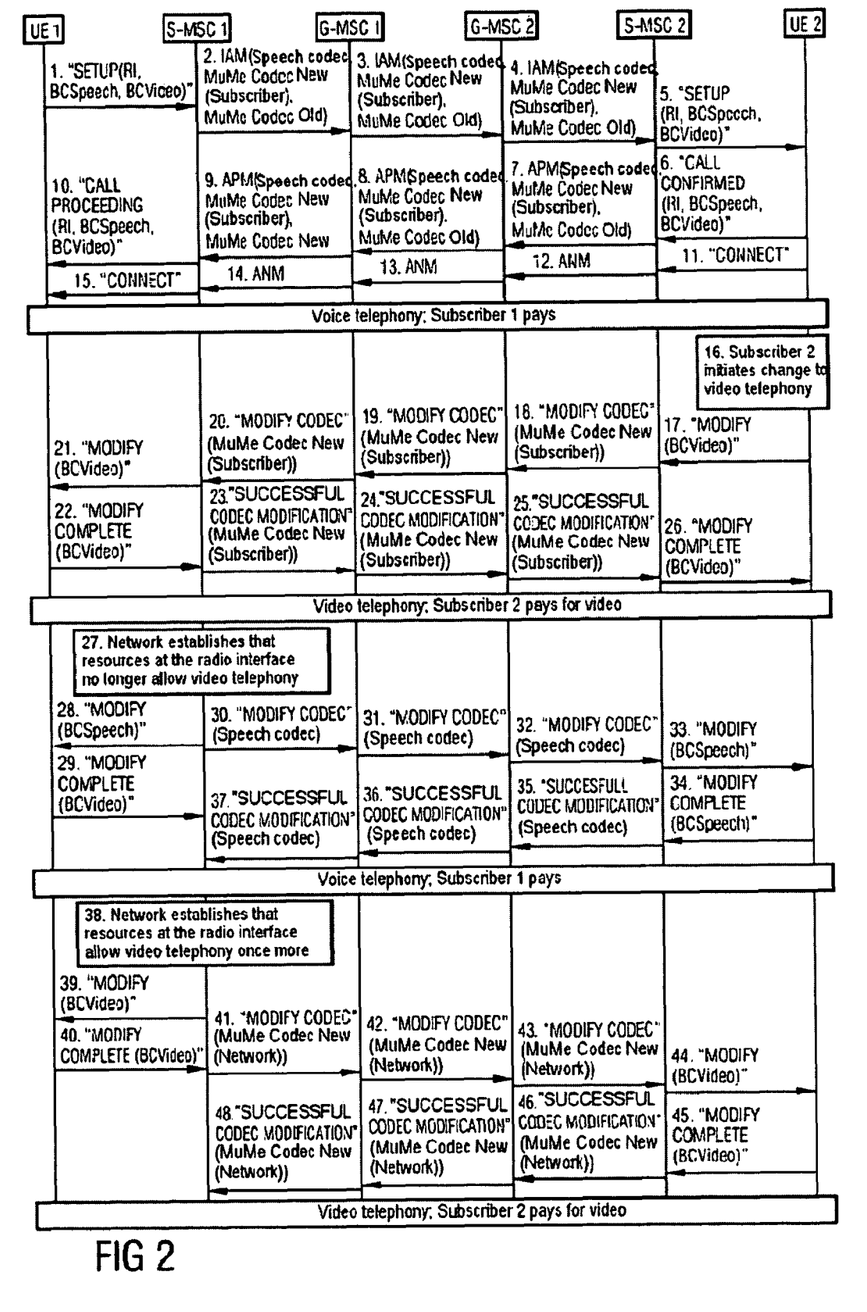
FIG. 2 shows a signaling profile according to the invention.

FIG. 2 shows a signaling profile according to the invention. The depicted signaling profile is as follows:

1. Subscriber 1 with his terminal device UE 1 decides to set up a SCUDIF connection to subscriber 2 with his terminal device UE 2, a voice telephony service being desired initially. The terminal device UE 1 accordingly sends a SETUP message to the serving switching unit S-MSC 1 and expresses therein in accordance with the already existing standard by means of what is referred to as the "Repeat Indicator" RI and what is referred to as the "Bearer Capabilities" BCSpeech and BCVideo that a SCUDIF connection is to be set up which initially uses a voice telephony service.

2. The serving switching unit S-MSC 1 signals to the gateway switching unit G-MSC 1 that a SCUDIF connection is to be set up which initially uses voice telephony. For this purpose the serving switching unit S-MSC 1, in conformance with the existing standard, uses what is referred to as a BICC IAM message of the BICC codec negotiation which has a list of codecs with one or more speech codecs as well as the MUME codec old which corresponds to the MuME dummy codec conforming to TS 26.103. The order of the codecs in the list expresses which codecs take precedence. According to the invention the list also includes the inventive further MUME codec New, which permits information to be expressed in a parameter indicating whether a service change was initiated by a network unit of the communication network S-MSC 1 or by a terminal device UE 1. The serving switching unit S-MSC 1 can also record data for call charging purposes for the accounting of the operator of the visited mobile radio network 1 with the operator of the home network 1 and/or forward said data to other network units, such as for example to a billing unit. The serving switching unit S-MSC 1 will in this case record or, as the case may be, store the information that subscriber 1 initiated the call setup with his terminal device UE 1.

3. Upon receiving the IAM message in accordance with the existing BICC standard, the gateway switching unit G-MSC 1 checks whether it can support the codecs contained therein and removes unknown codecs from the list which it then forwards in the IAM message to the next network unit. Thus, if the gateway switching unit G-MSC 1 does not support the newly introduced MuME codec New according to the invention, it will remove said codec from the list. In this example it is, however, assumed that the gateway switching unit G-MSC 1 does support the MuME codec New. Further BICC switching units which act likewise are possibly located between the serving switching unit S-MSC 1 and the gateway switching unit G-MSC 1. The gateway switching unit G-MSC 1 can also record data for charging purposes for the accounting of the operator of the home network 1 with the subscriber 1 with his terminal device UE 1 as well as with the operators of the visited mobile radio network 1 and of the home network 2 and/or forward said data to other network units, such as for example to a billing unit. In this case the gateway switching unit G-MSC 1 will record that subscriber 1 initiated the call setup with his terminal device UE 1. The gateway switching unit G-MSC 1 forwards the IAM message to the gateway switching unit G-MSC 2.

4. Analogously to step 3, the gateway switching unit G-MSC 2 checks the codec list, forwards the IAM message to the serving switching unit S-MSC 2 and records data for charging purposes.

5. Analogously to step 3, the serving switching unit S-MSC 2 checks the codec list and signals to the further terminal device UE 2 in accordance with the already existing standard by means of a SETUP message that a SCUDIF connection is to be set up which will initially use voice telephony (voice telephony service). The "Repeat Indicator" RI and the "Bearer Capabilities" BCSpeech and BCVideo are used in a similar manner to step 1. In a similar manner to step 2, the serving switching unit S-MSC 2 can store data for charging purposes. The serving switching unit S-MSC 2 stores the codecs contained in the codec list in accordance with the existing BICC standard, and may use only these codecs in subsequent BICC MODIFY-CODEC messages (BICC codec modification).

6. In accordance with the existing standard the further terminal device UE 2 confirms the SETUP message with a CALL-CONFIRMED message. The "Repeat Indicator" RI and the "Bearer Capabilities" BCSpeech and BCVideo are used in a similar manner to step 1. The terminal device UE 2 alerts subscriber 2 with an alarm, by ringing for example.

7. In accordance with the existing standard the serving switching unit S-MSC 2 sends a BICC APM message containing the codec list determined in step 5.

8. The gateway switching unit G-MSC 2 forwards the BICC APM message.

9. The gateway switching unit G-MSC 1 forwards the BICC APM message. In accordance with the existing standard the serving switching unit S-MSC 1 stores the codec list contained in the APM message.

10. In accordance with the existing standard the serving switching unit S-MSC 1 confirms the establishment of the SCUDIF connection to the terminal device UE 1 by means of a CALL-PROCEEDING message. The "Repeat Indicator" RI and the "Bearer Capabilities" BCSpeech and BCVideo are used in a similar manner to step 1.

11. The subscriber 2 with his terminal device UE 2 accepts the call. The further terminal device UE 2 signals this in accordance with the existing standard by means of a CONNECT message.

12. The serving switching unit S-MSC 2 sends what is called a BICC ANM message and records for charging purposes that the connection has been established.

13. The gateway switching unit G-MSC 2 forwards the BICC ANM message and records for charging purposes that the connection has been established.

14. The gateway switching unit G-MSC 1 forwards the BICC ANM message and records for charging purposes that the connection has been established.

15. The serving switching unit S-MSC 1 sends a CONNECT message to the terminal device UE 1 and records for charging purposes that the connection has been established.

The connection that is now set up is a SCUDIF connection which uses a voice telephony service. The voice telephony connection is billed to subscriber 1 with his terminal device UE 1. Subscriber 1 with his terminal device UE 1 and subscriber 2 with his terminal device UE 2 can receive an indication from the terminal device UE 1 and the further terminal device UE 2 respectively that a change to a video telephony service is possible.

16. Subscriber 2 with his terminal device UE 2 initiates the change to video telephony (video telephony service).

17. In accordance with the existing standard the further terminal device UE2 sends a MODIFY message containing the BCVideo parameter.

18. The serving switching unit S-MSC 2 sends a BICC MODIFY-CODEC message. According to the invention the serving switching unit S-MSC 2 uses MuME codec New therein and indicates by means of a parameter that the service change was initiated by the terminal device UE 2. If MUME codec New is not included in the codec list determined in step 5, the serving switching unit S-MSC 2 uses MuME codec Old (not shown in FIG. 2) instead. The serving switching unit S-MSC 2 can also record data for charging purposes for the accounting of the operator of the visited mobile radio network 2 with the operator of the home network 2 and/or forward said data to other network units. In this case the serving switching unit S-MSC 2 will record or store that subscriber 2 with his terminal device UE 2 initiated the change to video telephony. According to the invention the serving switching unit SMSC 2 can itself also store the information that subscriber 2 initiated the change to video telephony with his terminal device UE 2.

19. According to the invention the gateway switching unit G-MSC 2 derives from the inventive parameter in MuMe codec New that subscriber 2 initiated the change to video telephony with his terminal device UE 2 and records this in data for charging purposes and/or forwards said information to other network units. If the gateway switching unit G-MSC 2 had received MuMe codec Old instead, the gateway switching unit G-MSC 2 would likewise have concluded therefrom that subscriber 2 initiated the change to video telephony with his terminal device UE 2, since according to the invention MuMe codec Old will only be sent by a serving switching unit S-MSC which itself does not initiate a service change. According to the invention the gateway switching unit G-MSC 2 can itself also store the information that subscriber 2 initiated the change to video telephony with his terminal device UE 2. The gateway switching unit G-MSC 2 forwards the BICC MODIFY-CODEC message.

20. The gateway switching unit G-MSC 1 proceeds in a similar manner to step 19.
21. The serving switching unit S-MSC 1 evaluates the received MuME codec New in a similar manner to step 19. Using the already standardized MODIFY message, the serving switching unit S-MSC 1 signals the change to video telephony to the terminal device UE 1.
22. Subscriber 1 with his terminal device UE 1 accepts the change to video telephony. In accordance with the existing standard the terminal device UE 1 sends a MODIFY-COMPLETE message.
23. In accordance with the existing standard the serving switching unit S-MSC 1 sends a BICC SUCCESSFUL-CODEC-MODIFICATION message.
24. The gateway switching unit G-MSC 1 forwards the SUCCESSFUL-CODEC-MODIFICATION message.
25. The gateway switching unit G-MSC 2 forwards the SUCCESSFUL-CODEC-MODIFICATION message.
26. The serving switching unit S-MSC 2 sends a MODIFY-COMPLETE message.

The connection that is now set up is a SCUDIF connection which is used for video telephony. The additional costs for the video telephony connection compared to the voice telephony connection, or else the total costs of the call from the time of the change to video telephony are billed to the subscriber 2 with his terminal device UE 2.

27. The serving switching unit S-MSC 1 establishes that the resources at the air (radio) interface to subscriber 1 with his terminal device UE 1 no longer allow video telephony.
28. The serving switching unit S-MSC 1 sends an already standardized MODIFY message containing the BCSpeech parameter to the terminal device UE 1 in order to initiate a change to voice telephony.
29. In accordance with the existing standard the terminal device UE 1 sends a MODIFY-COMPLETE message in order to confirm the change.
30. The serving switching unit S-MSC 1 sends a BICC MODIFY-CODEC message which contains a speech codec. The serving switching unit S-MSC 1 can also record data for charging purposes for the accounting of the operator of the visited mobile radio network 2 with the operator of the home network 2 and/or forward said data to other network units. The serving switching unit S-MSC 1 will in this case record that a change to voice telephony was initiated.
31. The gateway switching unit G-MSC 1 records the change to voice in data for charging purposes and/or forwards said information to other network units. The gateway switching unit G-MSC 1 forwards the BICC MODIFY-CODEC message.
32. The gateway switching unit G-MSC 2 proceeds in a similar manner to step 31.
33. The serving switching unit S-MSC 2 stores the change to voice in a similar manner to step 31. Using the already standardized MODIFY message, the serving switching unit S-MSC 2 signals the change to voice to the further terminal device UE 2.
34. In accordance with the existing standard the further terminal device UE 2 sends a MODIFY-COMPLETE message.
35. In accordance with the existing standard the serving switching unit S-MSC 2 sends a BICC SUCCESSFUL-CODEC-MODIFICATION message.
36. The gateway switching unit G-MSC 2 forwards the SUCCESSFUL-CODEC-MODIFICATION message.
37. The gateway switching unit G-MSC 1 forwards the SUCCESSFUL-CODEC-MODIFICATION message.

A SCUDIF connection that is used for voice telephony is now set up. This connection can once again be billed to the subscriber 1 with his terminal device UE 1 because said subscriber initiated the setup of the original SCUDIF connection.

38. The serving switching unit S-MSC 1 establishes that the resources at the air (radio) interface to subscriber 1 with his terminal device UE 1 once again allow video telephony. According to the invention, the serving switching unit SMSC 1 checks whether MuME codec New is contained in the codec list received in step 9. Only if this is the case does the serving switching unit S-MSC 1 initiate a change to video telephony.
39. The serving switching unit S-MSC 1 sends an already standardized MODIFY message containing the BCVideo parameter to the terminal device UE 1 in order to offer a change to video telephony.
40. Subscriber 1 with his terminal device UE 1 accepts the change to video telephony. In accordance with the existing standard the terminal device UE 1 sends a MODIFY-COMPLETE message in order to confirm the change.
41. The serving switching unit S-MSC 1 sends a BICC MODIFY-CODEC message. According to the invention the serving switching unit S-MSC 1 uses MuME codec New therein and indicates by means of a parameter that the service change was initiated by a network unit of the communication network S-MSC 1. The serving switching unit S-MSC 1 can also record data for charging purposes for the accounting of the operator of the visited mobile radio network 2 with the operator of the home network 2 and/or forward said data to other network units. The serving switching unit SMSC 1 will in this case record that the serving switching unit S-MSC 1 initiated the change to video telephony. The serving switching unit S-MSC 1 can also insert in the data for charging purposes the information stored in step 21 to the effect that subscriber 2 initiated the change to video telephony with his terminal device UE 2.
42. According to the invention the gateway switching unit G-MSC 1 derives from the inventive parameter in MuMe codec New that the serving switching unit S-MSC 1 initiated the change to video telephony and records this in data for charging purposes and/or forwards said information to other network units. The gateway switching unit G-MSC 1 can also insert in the data for charging purposes the information stored in step 20 to the effect that subscriber 2 initiated the change to video telephony with his terminal device UE 2.

43. The gateway switching unit G-MSC 1 forwards the BICC MODIFY-CODEC message.
44. The gateway switching unit G-MSC 2 proceeds in a similar manner to step 42.
45. The serving switching unit S-MSC 2 evaluates the received MUME codec New in a similar manner to step 42. Using the already standardized MODIFY message, the serving switching unit S-MSC 1 signals the change to video telephony to the further terminal device UE 2.
46. Subscriber 2 with his terminal device UE 2 accepts the change to video telephony. In accordance with the existing standard the further terminal device UE 2 sends a MODIFY-COMPLETE message.
47. In accordance with the existing standard the serving switching unit S-MSC 2 sends a BICC SUCCESSFUL-CODEC-MODIFICATION message.
48. The gateway switching unit G-MSC 2 forwards the SUCCESSFUL-CODEC-MODIFICATION message.
49. The gateway switching unit G-MSC 1 forwards the SUCCESSFUL-CODEC-MODIFICATION message.

A SCUDIF connection which will be used for video telephony is now set up. The additional costs for the video telephony connection compared to the voice telephony connection, or else the total costs of the call from the time of the change to video telephony will be billed to the subscriber 2 who originally initiated the video telephony with his terminal device UE 2.

Figure 3:
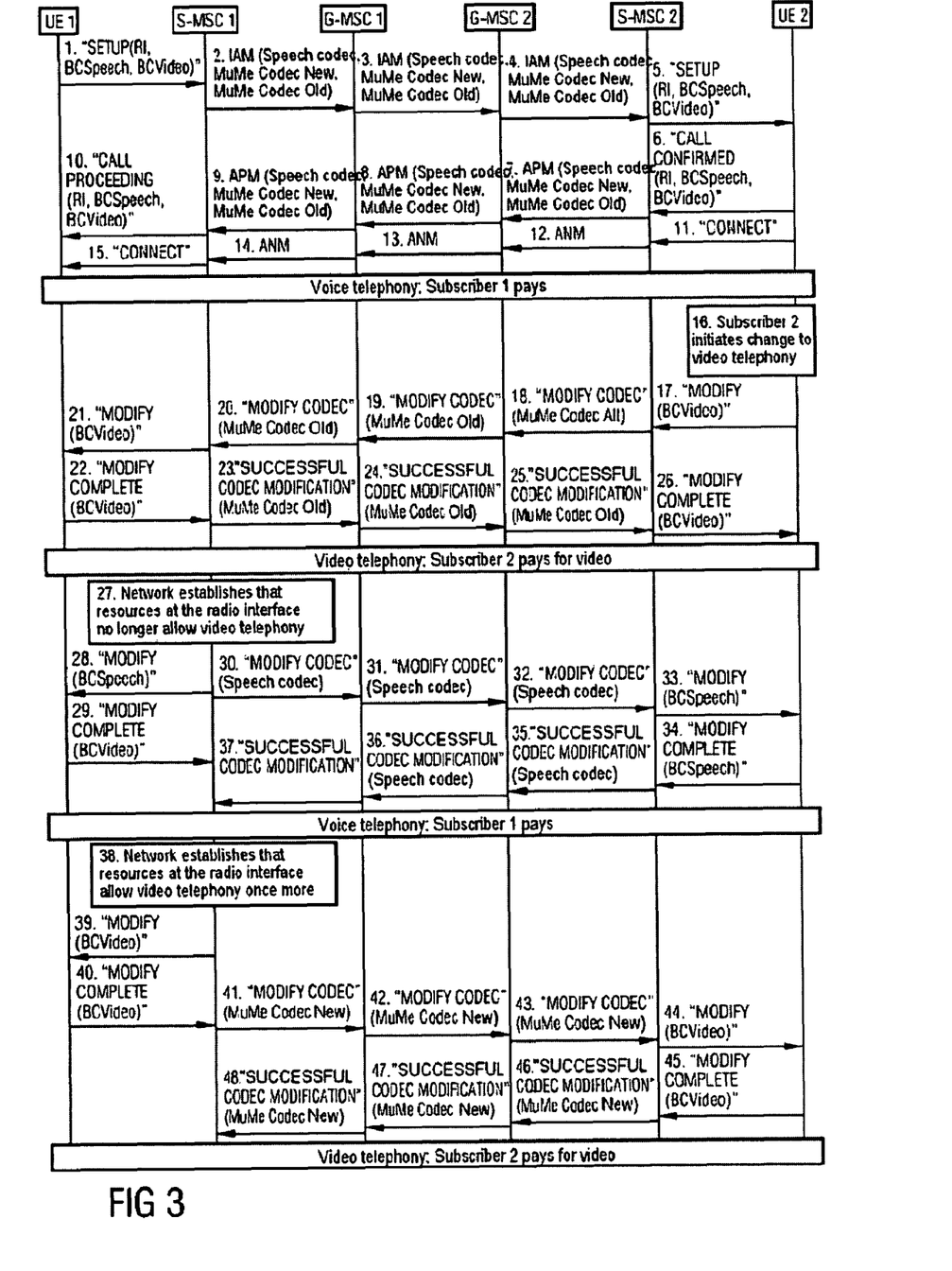
FIG. 3 shows a possible encoding of the modified MuMe codec.

FIG. 3 shows a typical signaling profile in the network configuration depicted in FIG. 1, where, in contrast to FIG. 2, a different encoding of the information concerning whether the terminal device or a network unit of the communication network initiated the change to video telephony is used:

MuME codec Old is used in the BICC MODIFY message in order to indicate that a subscriber initiated the change with his terminal device. MuME codec New is used in the BICC MODIFY message in order to indicate that a network unit of the communication network initiated the change. MuMe codec Old corresponds to the MuME dummy codec in accordance with TS 26.103. MuMe codec New corresponds to the MuME dummy codec in accordance with TS 26.103, although in order to differentiate it a different value is used in what is called the CoID parameter. MuME dummy codec New requires no additional parameters.

The signaling profile shown corresponds to the signaling profile described in FIG. 2 with the exception of the differences described in the following:

18. According to the invention the serving switching unit S-MSC 2 uses MuMe codec Old in order to indicate that the subscriber initiated the service change with his terminal device.
19. to 21. According to the invention, the gateway switching unit G-MSC 2, the gateway switching unit G-MSC 1 and the serving switching unit S-MSC 1 conclude from the use of the MuMe codec Old that the subscriber initiated the service change with his terminal device.
41. According to the invention, the serving switching unit S-MSC 1 uses MuMe codec New in order to indicate that a network unit of the communication network initiated the service change.
42. to 44. According to the invention, the gateway switching unit G-MSC 1, the gateway switching unit G-MSC 2 and the serving switching unit S-MSC 2 conclude from the use of the MuMe codec Old that the subscriber initiated the service change with his terminal device.

Figure 4:
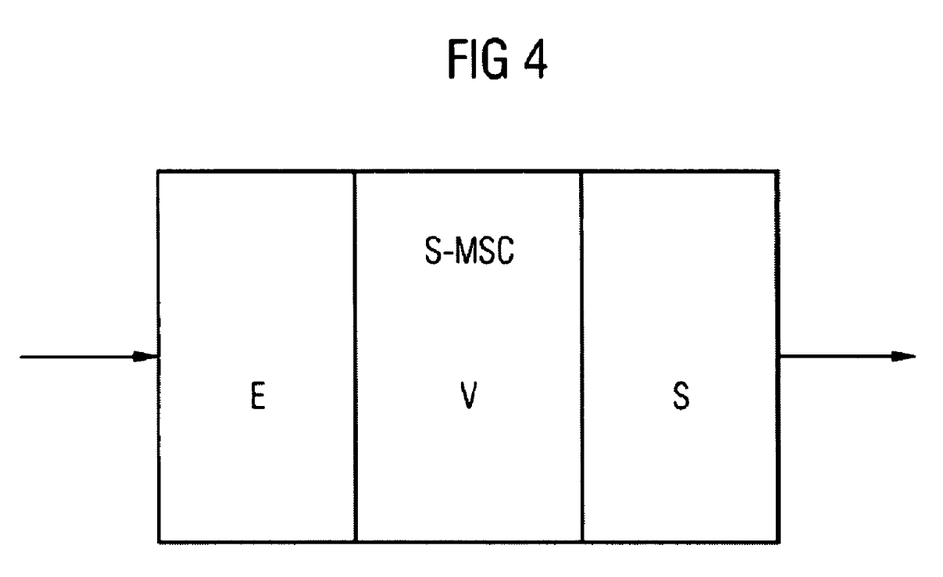
FIG. 4 shows a network unit according to the invention.

FIG. 4 shows an inventive network unit according to FIG. 2 and FIG. 3 with a receiving unit E, a transmitting unit S and a processing unit V for performing the method according to the invention.

The invention claimed is:

1. A method for signaling a change from a first service to a second service during a call between a terminal device and a further terminal device over at least one communication network, comprising:
    when a change from the first service to the second service takes place during a call between the terminal device and the further terminal device, signaling by a network unit of the communication network, via which the terminal device is currently communicating, to at least one further network unit whether the change was initiated by the terminal device or by a network unit of the communication network; and
    adding at least one parameter to a MuMe dummy codec, said parameter indicating whether the change was initiated by the terminal device or by a network unit of the communication network;
    the change including a change from a voice telephony service to a video telephony service, text telephony service or image telephony service.

2. The method of claim 1, wherein at least one signaling message between the network unit and the at least one further network unit includes at least one parameter which indicates that the change from the first service to the second service during a call between the terminal device and the further terminal device was initiated by a network unit of the communication network.

3. The method of claim 1, further comprising
    changing a most significant bit of a bandwidth multiplier parameter of the MuMe dummy codec if the service change was initiated by a network unit of the communication network.

4. The method of claim 1, further comprising
    replacing the MuMe dummy codec in at least one of a BICC codec negotiation and BICC codec modification by a further dummy codec, wherein the MuMe dummy codec includes at least one parameter indicating whether a change from a voice telephony service to a video telephony service was initiated by a network unit of the communication network.

5. The method of claim 1, further comprising
    when the change from a voice telephony service to a video telephony service takes place, using a MuMe dummy codec which is only used if a terminal device initiated the change from the voice telephony service to the video telephony service.

6. The method of claim 5, further comprising
    when the change from a voice telephony service to a video telephony service takes place, using a further MuMe dummy codec which is only used if a network unit of the communication network initiated the change from the voice telephony service to the video telephony service.

7. The method of claim 6, wherein the MuMe dummy codec and the further MuMe dummy codec are differentiated by means of a value of a "Codec Identifier" parameter.

8. The method of claim 4, wherein the MuMe dummy codec is used within a scope of the signaling for at least one of the BICC codec negotiation and BICC codec modification.

9. The method of claim 6, further comprising
    using the further MuMe dummy codec within the scope of the signaling for at least one of the BICC codec negotiation and BICC codec modification.

10. The method of claim 1, further comprising
receiving by the further network unit, when the change from a first service to a second service takes place, signaling containing at least one item of information indicating whether the change was initiated by the terminal device or by a network unit of the communication network, storing said at least one item of information in the further network unit, and forwarding the at least one item of information to further network units.

11. The method of claim 10, wherein the network units use the at least one item of information indicating whether the change was initiated by the terminal device or by a network unit of the communication network for taking a decision concerning the billing of the service.

12. The method of claim 10, further comprising storing at least one item of information by a network unit if a terminal device initiated the change from a first service to a second service.

13. The method of claim 12, wherein the at least one item of information includes at least one information element identifying the terminal device.

14. The method of claim 1, wherein the network unit is at least one of a serving switching unit and/and a serving GPRS support node.

15. The method of claim 1, wherein the further network unit is at least one of a billing unit, a serving switching unit, a serving GPRS support node, a gateway switching unit and a gateway GPRS support node.

16. The method of claim 1, wherein at least one of a mobile radio terminal device, a mobile computer, a mobile organizer and a computer is used as a terminal device.

17. The method of claim 1, wherein signaling standardized within the scope of SCUDIF is used between the terminal device and the network units of the communication network.

18. The method of claim 1, wherein signaling standardized within the scope of SCUDIF is used between the network units of the communication network.

19. The method of claim 1, wherein at least one of a packet-switching communication network, a cellular mobile radio network and an IP network is used as the communication network.

20. A network unit for signaling and receiving information concerning a change from a first service to a second service during a call between a terminal device and a further terminal device over at least one communication network, comprising:
a receiving unit and a transmitting unit for performing the communication, and
a processing unit for signaling, upon detecting a service change taking place during a call between the terminal device and the further terminal device, an indication to a further network unit which indication specifies whether the change was initiated by a terminal device or by a network unit of the communication network;
said detected change which is performed during the call being a change from a voice telephony service to a video telephony service, text telephony service or image telephony service;
said processing unit adding at least one parameter to a MuMe dummy codec; and
said parameter indicating whether the change was initiated by the terminal device or by a network unit of the communication network.

21. The network unit of claim 20, wherein at least one of a billing unit, a gateway switching unit, a serving switching unit and a gateway GPRS support node is provided as a further network unit.

22. A method for signaling a change from a first service to a second service during a call between a terminal device and a further terminal device over at least one communication network, comprising:
when a change from the first service to the second service takes place during a call between the terminal device and the further terminal device, signaling by a network unit of the communication network, via which the terminal device is currently communicating, to at least one further network unit, whether the change was initiated by the terminal device or by a network unit of the communication network; and
when the change from a voice telephony service to a video telephony service takes place, using a MuMe dummy codec which is only used if a terminal device initiated the change from the voice telephony service to the video telephony service;
the change including a change from a voice telephony service to a video telephony service, text telephony service or image telephony service.

23. The method of claim 22, further comprising:
when the change from a voice telephony service to a video telephony service takes place, using a further MuMe dummy codec which is only used if a network unit of the communication network initiated the change from the voice telephony service to the video telephony service.

24. The method of claim 23, wherein the MuMe dummy codec and the further MuMe dummy codec are differentiated by means of a value of a "Codec Identifier" parameter.

* * * * *